United States Patent
Okumura et al.

(10) Patent No.: US 10,026,019 B2
(45) Date of Patent: Jul. 17, 2018

(54) PERSON DETECTING DEVICE AND PERSON DETECTING METHOD

(71) Applicant: MITSUBISHI ELECTRIC CORPORATION, Tokyo (JP)

(72) Inventors: Seiji Okumura, Tokyo (JP); Shinichiro Otani, Tokyo (JP); Fumio Igarashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 7 days.

(21) Appl. No.: 15/118,420

(22) PCT Filed: Jan. 28, 2015

(86) PCT No.: PCT/JP2015/000356
§ 371 (c)(1),
(2) Date: Aug. 11, 2016

(87) PCT Pub. No.: WO2015/136828
PCT Pub. Date: Sep. 17, 2015

(65) Prior Publication Data
US 2017/0169312 A1    Jun. 15, 2017

(30) Foreign Application Priority Data
Mar. 11, 2014    (JP) .................................. 2014-047281

(51) Int. Cl.
*G06K 9/62*    (2006.01)
*G05B 15/02*    (2006.01)
(Continued)

(52) U.S. Cl.
CPC .......... *G06K 9/6267* (2013.01); *G05B 15/02* (2013.01); *G06K 9/00335* (2013.01); *G06K 9/52* (2013.01);
(Continued)

(58) Field of Classification Search
CPC .... G06K 9/6267; G06K 9/00335; G06K 9/52; G06K 9/6215; G06T 7/73; G05B 15/02
See application file for complete search history.

(56) References Cited

U.S. PATENT DOCUMENTS

| 8,437,503 B2* | 5/2013 | Verdant ................... G06T 7/254 382/103 |
| 2003/0002712 A1* | 1/2003 | Steenburgh ........ G06K 9/00778 382/103 |

(Continued)

FOREIGN PATENT DOCUMENTS

| JP | 5-205175 A | 8/1993 |
| JP | 2000-82146 A | 3/2000 |

(Continued)

*Primary Examiner* — David F Dunphy
(74) *Attorney, Agent, or Firm* — Birch, Stewart, Kolasch & Birch, LLP (57) ABSTRACT

In a method to detect a stationary person by a tracking method using images, image feature quantities of objects, other than persons, are registered in advance, and when the image feature quantity of a stationary region of an image does not resemble the preregistered ones, the stationary region is recognized as a person. Hence, there has been a problem that it requires a large volume of image feature quantities to be collected and registered in advance. A person detecting device and a person detecting method which relate to the present invention determine a stationary region on the basis of the distance between the position of a first moving-object region extracted from an image and the position of a second moving-object region extracted from an image previous to the image of the first moving-object region. The presence or absence of a person is determined by using the image feature variation of the stationary region. Therefore, apparatuses can be controlled in accordance with person information including a stationary person without collecting and registering a large volume of the image feature quantities.

7 Claims, 7 Drawing Sheets

(51) Int. Cl.
  *G06K 9/00*     (2006.01)
  *G06K 9/52*     (2006.01)
  *G06T 7/73*     (2017.01)
  *G06K 9/46*     (2006.01)
  *G08B 13/196*   (2006.01)

(52) U.S. Cl.
  CPC .............. *G06K 9/6215* (2013.01); *G06T 7/73* (2017.01); *G06K 9/00771* (2013.01); *G06K 2009/4666* (2013.01); *G06T 2207/30196* (2013.01); *G08B 13/19602* (2013.01)

(56) References Cited

U.S. PATENT DOCUMENTS

| | | | |
|---|---|---|---|
| 2008/0074496 A1* | 3/2008 | Venetianer | G06K 9/00335 348/150 |
| 2011/0090358 A1* | 4/2011 | Tojo | G06K 9/00771 348/222.1 |
| 2012/0206597 A1* | 8/2012 | Komoto | G06K 9/00805 348/135 |
| 2013/0182114 A1* | 7/2013 | Zhang | H04N 7/18 348/150 |
| 2014/0348382 A1* | 11/2014 | Sasatani | G06K 9/00369 382/103 |
| 2015/0125032 A1 | 5/2015 | Yamanaka et al. | |
| 2015/0235237 A1* | 8/2015 | Shaw | G06Q 30/0201 705/7.29 |

FOREIGN PATENT DOCUMENTS

| | | | | |
|---|---|---|---|---|
| JP | 2002-197463 A | 7/2002 | | |
| JP | 2004-94518 A | 3/2004 | | |
| JP | 2010-176206 A | 8/2010 | | |
| JP | 2010-199701 A | 9/2010 | | |
| JP | 2010-273112 A | 12/2010 | | |
| JP | 2011-198244 A | 10/2011 | | |
| JP | 2012-212238 A | 11/2012 | | |
| JP | 2012-212248 A | 11/2012 | | |
| WO | WO 00/73996 | * | 12/2000 | G06T 7/20 |
| WO | WO 2013/187047 A1 | 12/2013 | | |

* cited by examiner

Direction of time passage

Fig. 8

Direction of time passage

Fig. 9

Direction of time passage

Fig. 10

| Moving-object ID | Position | Coordinates of region | | State |
|---|---|---|---|---|
| | | Left top | Right bottom | |
| 1 | [30,100] | [0,70] | [60,130] | Moving state |
| 2 | [100,120] | [70,90] | [130,150] | Moving state |
| 3 | [50,200] | [20,170] | [80,230] | Stationary state |
| 4 | [200,120] | [180,100] | [220,140] | Stationary state |
| 5 | [460,100] | [430,70] | [490,130] | Moving state |
| ⋮ | ⋮ | ⋮ | ⋮ | ⋮ |

Fig. 11

| Moving-object ID | Image | Number of updates |
|---|---|---|
| 3 |  | 1 |
| 4 |  | 3 |
| ⋮ | ⋮ | ⋮ |

Fig. 12

Fig. 13
Feature quantity variation

PERSON DETECTING DEVICE AND PERSON DETECTING METHOD

TECHNICAL FIELD

The present invention relates to a device which detects a person by using images.

BACKGROUND ART

Until now, there has been a need to control apparatuses in accordance with presence or absence of persons for energy saving. To determine the presence or absence of a person, person sensors using infrared rays, for example, are often used. A person sensor using infrared rays, however, cannot respond to a stationary person, nor determine the position of a person in the sensor coverage area even if the person is moving. Detecting of a person as well as the person's position, therefore, by using images taken by a camera has been conducted. For example, there are:
(1) Specific Object Detection Method by statistical learning of the feature quantities of images (image feature quantity),
(2) Background Difference Method by using the difference from the background image, and
(3) Inter-Frame Difference Method by using the difference from the previous image.

Among the typical methods of (1) Specific Object Detection Method is AdaBoost algorithm using Haar-Like feature or HOG (Histograms of Oriented Gradients) feature, which is mainly used for detection of a human face or a person. This method is effective for an object with rich image feature quantity, but detection of an object with poor feature quantity is difficult Because an image only of human heads and shoulders, for example, taken from right over them by a camera on the ceiling does not have unique feature quantity such as a human face and the shape of a person, failure in detecting a person or frequent erroneous detection happens.

Background Difference Method (2) can accurately extract the position of a person by calculating the difference between an image on which no person is photographed, which is used as the background image, and an image on which a person is photographed. However, this method is known to be weak against change in surrounding illuminance. Therefore, a method to moderately update the background image to meet the external environment has been considered. However, in the environment such as an office and a factory where comings and goings of people or on and off of lights are frequent, it is difficult to choose the optimum background image.

Inter-Frame Difference Method (3) can detect a moving object by calculating the difference between the previous image and the current image in time series, and is also relatively robust against the change in surrounding illuminance. However, because an object that does not move cannot be detected, a stationary person cannot be also detected.

Conventional techniques of the Inter-Frame Difference Method to detect a stationary object include a tracking method which tracks a moving object in an image to determine it to stop at the position where its movement has disappeared.

A problem with the tracking method is that, when plural objects which move (moving objects) exist, they cannot be tracked in the image, and as the result, whether they still exist at the positions where they stopped cannot be determined.

Furthermore, because there is a case where a moving object is not a person (for example, a chair with casters has moved), it is difficult to detect only a stationary person.

To cope with these, as a method to detect a stationary person by the tracking method using images, there is a technique to determine a stationary object by comparing the image feature quantities of image regions of stationary objects stored in advance with the image feature quantity of a specific object (for example, Patent Document 1).

PRIOR ART DOCUMENT

Patent Document

Japanese Patent Laid-Open Publication No. 2012-212238

SUMMARY OF THE INVENTION

Problems to be Solved by the Invention

In the conventional method to detect a stationary person by the tracking method using images, there is a problem that it requires a large volume of image feature quantities to be collected and registered in advance, because an object is determined to be a person when the image feature quantity of the stationary image region does not resemble any of the image feature quantities of objects, other than persons, registered in advance.

There may be a method which determines an object to be a person when the image feature quantity does resemble those of persons registered in advance. However, because the feature quantities vary depending on clothes and hairstyles, a large volume of image feature quantities are required to be collected and registered in advance anyway.

Means to Solve the Problems

A person detecting device which relates to the present invention includes an image acquisition unit to acquire a photographed image, a stationary region determination unit to determine, on the basis of a distance between a position of a first moving-object region extracted from an image acquired by the image acquisition unit and a position of a second moving-object region extracted from an image previous to the image of the first moving region, a stationary region where a moving object of the second moving-object region is in a stationary state, and a stationary person determination unit to determine presence or absence of a person using the feature variation of the image of the stationary region.

Effects of the Invention

The present invention determines a stationary region on the basis of the distance between the position of a first moving-object region extracted from an image and the position of a second moving-object region extracted from an image previous to the image of the first moving-object region. The presence or absence of a person is determined by using the image feature variation of the stationary region. Therefore, apparatuses can be controlled in accordance with person information including a stationary person without collecting and registering a large volume of the image feature quantities.

BRIEF DESCRIPTION OF THE DRAWINGS

In the embodiment of the present invention.

EMBODIMENT FOR CARRYING OUT THE INVENTION

An embodiment of the person detecting device and the person detecting method relating to the present invention will be explained below in detail using drawings. The invention, however, will not be limited by the embodiment.

Embodiment

Figure 1:
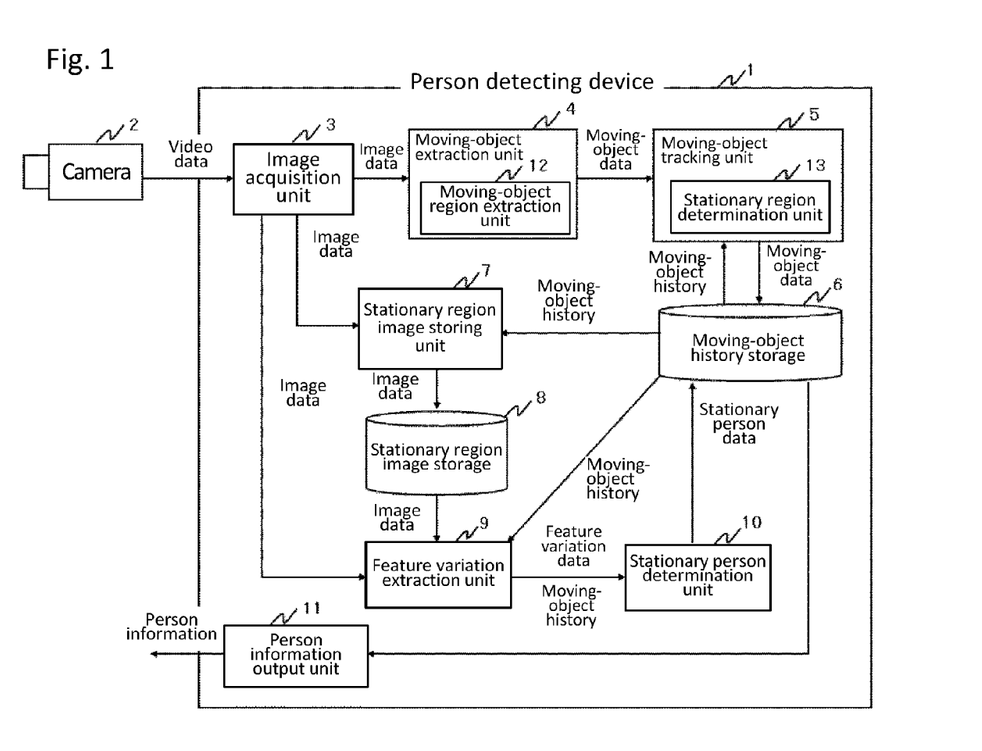
FIG. 1 is a configuration diagram of a person detecting device 1 in an embodiment of the present invention.

FIG. 1 is a configuration diagram of a person detecting device 1 in the embodiment of the present invention. In FIG. 1, the person detecting device 1 acquires image data from a camera 2 which takes images of a specific area, and detects the number of persons and their positions in the specific area, and outputs them as person information.

The camera 2 is supposed to be set on the ceiling in the explanation of the embodiment. However, the camera may be set anywhere. Also, the person detecting device 1 and the camera 2 may be either separate components or integrated into one body. For example, the camera 2 is set on the ceiling and the person detecting device 1 is set on the floor or in a control room of the building. The camera 2 and the person detecting device 1 are connected with a LAN (Local Area Network) cable or a coaxial cable. The person detecting device 1 may acquire the image data from plural cameras 2 to detect a person.

The person detecting device 1 includes an image acquisition unit 3, a moving-object extraction unit 4, a moving-object tracking unit 5, a moving-object history storage 6, a stationary region image storing unit 7, a stationary region image storage 8, a feature variation extraction unit 9, a stationary person determination unit 10 and a person information output unit 11. The moving-object extraction unit 4 includes a moving-object region extraction unit 12 and the moving-object tracking unit 5 includes a stationary region determination unit 13.

The person detecting device 1 is loaded with an arithmetic unit such as a CPU (Central Processing Unit) and each of the processing units (3 through 13) runs as a program on the arithmetic unit. The person detecting device 1 is loaded with storages such as a ROM (Read Only Memory), a RAM (Random Access Memory), a flash memory or a hard disk. Each storage (6 and 8) can use these storages.

The components of the person detecting device 1 will be explained below.

The image acquisition unit 3 acquires image data from the camera 2 taken by the camera 2, extracts the image of the latest one frame from the acquired image data, and stores the image data of the latest one frame in a primary storage (not illustrated).

When the latest image data is inputted into the primary storage, the moving-object region extraction unit 13 of the moving-object extraction unit 4 calculates the difference between the latest image data inputted into the primary storage and the image data of the previous frame stored in the primary storage. The image blocks whose differences are equal to or larger than a predetermined threshold are grouped to be extracted as a moving-object region. The extracted moving-object data (for example, a position of the moving-object region and coordinates of the region) is outputted to the moving-object tracking unit 5.

When the moving-object data is inputted from the moving-object region extraction unit 12 of the moving-object extraction unit 4, the moving-object tracking unit 5 acquires the positions of all the moving-object regions of the previous frame as the previous positions, referring to the history of the moving-object data stored in the moving-object history storage 6. The moving object in the moving-object regions is tracked on the basis of the distances between the positions of all the moving-object regions in the previous frame and the position of the moving-object region inputted from the moving-object region extraction unit 12 of the moving-object extraction unit 4. The stationary region determination unit 13 of the moving-object tracking unit 5 determines the moving-object region to be a stationary region in which the moving object is in a stationary state, on the basis of the distances between the positions of all the moving-object regions of the previous frame and the position of the moving-object region inputted from the moving-object region extraction unit 12 of the moving-object extraction unit 4. The information, inputted from the moving-object extraction unit 4, on the position of the moving-object region (for example, the center position of the moving-object region), the coordinates of the moving-object region, the state of the moving-object region (moving state or stationary state), and the moving-object ID (identification) to identify the moving object is outputted to the moving-object history storage 6 as the latest moving-object data and stored therein.

The moving-object data of the moving-object regions is inputted from the moving-object tracking unit 5 into the moving-object history storage 6 and stored therein. The moving-object history information of the moving-object data stored in the moving-object history storage 6 is referred to from the moving-object tracking unit 5, the stationary region image storing unit 7, the feature variation extraction unit 9, and the person information output unit 11. When the stationary person determination unit 10 determines that there is no person in a stationary region, the data of the stationary region in the moving-object history storage 6 is deleted.

When information of the stationary region is inputted in the moving-object history storage 6, the stationary region image storing unit 7 acquires information of all the stationary regions stored in the moving-object history storage 6. The latest image data stored in the primary storage is acquired and the stationary regions are cut out from the acquired image data, outputted to the stationary region image storage 8, and stored therein.

In the stationary region image storage 8, the image data of the stationary regions of the latest image data is inputted from the stationary region image storing unit 7 and stored. The information of the stationary regions stored in the stationary region image storage 8 is referred to from the feature variation extraction unit 9. When the stationary person determination unit 10 determines that there is no person in a stationary region, the data of the stationary region in the stationary region image storage 8 is deleted.

When image data of a stationary region is inputted in the stationary region image storage 8, the feature variation extraction unit 9 extracts the variation (feature variation) between the feature quantity of the image of the latest stationary region stored in the primary storage and the feature quantity of the image of the stationary region of the previous frame stored in the stationary region image storage 8, and then outputs the extracted feature variation of the image to the stationary person determination unit 10.

When the feature variation of the image is inputted from the feature variation extraction unit 9, if the inputted feature variation of the image is within a predetermined range after a predetermined time, the stationary person determination unit 10 determines that there is a person in the stationary region, and, if the variation is outside the predetermined range, determines that there is no person in the stationary region. Then, the stationary person data indicating that there is a stationary person in the stationary region is outputted to the moving-object history storage 6 and stored therein. The data of the stationary region which is determined to include no person is deleted from the moving-object history storage 6.

The processing of the stationary region image storing unit 7 or the feature variation extraction unit 9 may be included in the processing of the stationary person determination unit 10.

The person information output unit 11 is a communication unit which outputs information including the number and the positions of the detected persons to an external device. At a predetermined time interval or upon an instruction from an external device, for example, the person information output unit 11 calculates the person information including the number and the positions of the persons from the moving-object regions and the stationary regions which are detected as a person by referring to the data stored in the moving-object history storage 6, and outputs the person information to the external device. The external device is a device or a system which controls energy or sounds alarm in accordance with the number and the positions of persons, such as a lighting controller, an air conditioning controller and an intrusion warning device.

The above is the explanation on each component of the person detecting device 1.

Next, the operation of the person detecting device 1 will be explained.

FIG. 2 through 6 are flowcharts which show the processing of the person detecting device 1 in the embodiment of the present invention.

Firstly, the processing of the image acquisition unit 3 and the moving-object extraction unit 4 will be explained using FIG. 2.

The image acquisition unit 3 acquires image data taken by the camera 2 from the camera 2, and acquires the image of the latest one frame out of the acquired image data (S1).

If the acquired image data is an analog signal, it is converted into a digital image of one frame.

If the acquired image data is compressed and encoded image data such as Motion JPEG (Joint Photographic Experts Group) or MPEG (Moving Picture Experts Group), it is decoded and converted into a digital image of one frame. The digital image may be a color image in RGB format or YUV format, or a luminance image (gray scale image).

The image of the acquired latest one frame is outputted to the moving-object extraction unit 4, and is stored into the primary storage (S2).

Next, the moving-object extraction unit 4 extracts a moving-object region from the image of the latest one frame stored in the primary storage.

Figure 7:
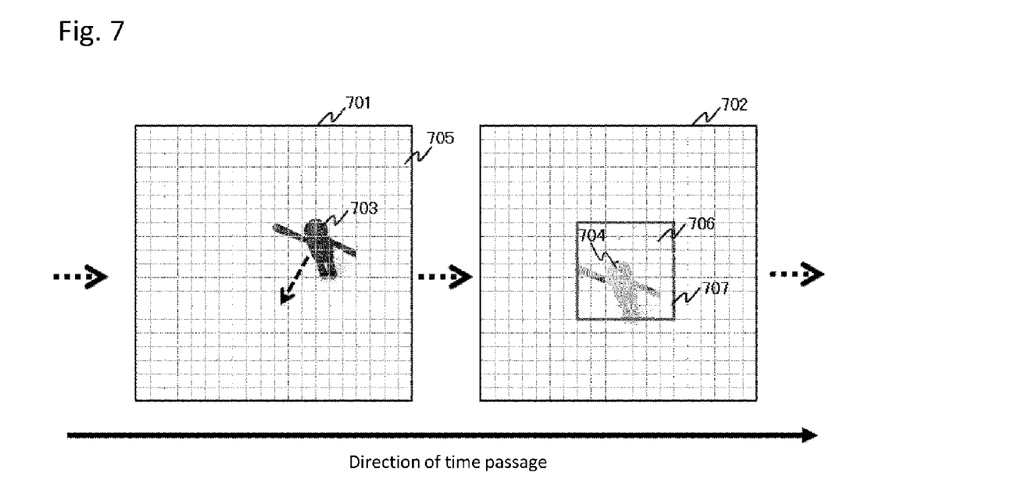
FIG. 7 is a diagram which explains processing of the moving-object extraction unit 4 in the embodiment of the present invention.

FIG. 7 is a diagram of images which show a processing of the moving-object extraction unit 4 in the embodiment of the present invention.

An image 701 and an image 702 in FIG. 7 are images stored in the primary storage. The image 701 is an image of the previous frame of the latest image 702 acquired by the image acquisition unit 3. FIG. 7 shows a state in which the object 703 and the object 704 are photographed in the image 701 and the image 702, respectively.

Figure 2:
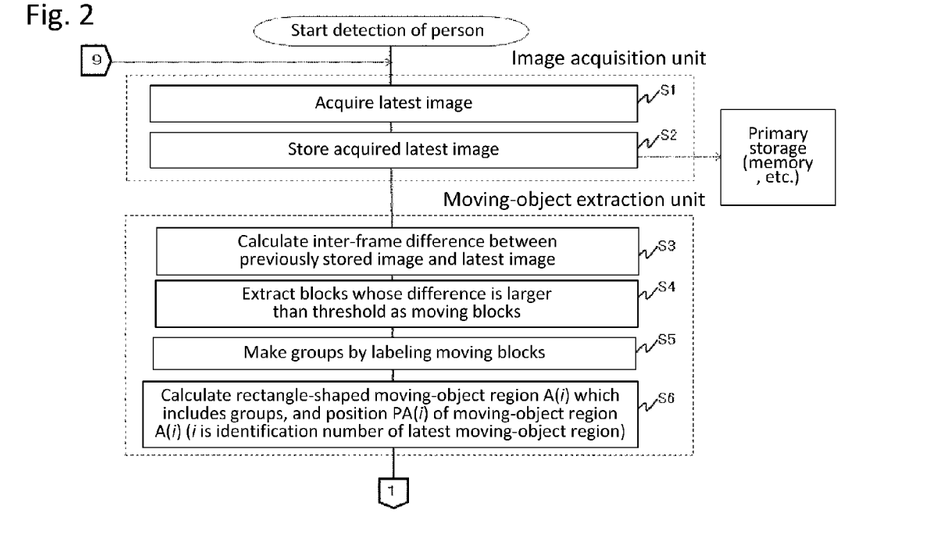
FIG. 2 is a flowchart which shows processing of an image acquisition unit 3 and a moving-object extraction unit 4 of the person detecting device 1 in the embodiment of the present invention.

Returning to the flowchart of FIG. 2, when the latest image 702 is inputted into the primary storage, the moving-object extraction unit 4 calculates the inter-frame difference between the latest image 702 and the image 701 of the previous frame stored in the primary storage (S3).

Then, image blocks 705 whose inter-frame differences are equal to or larger than the predetermined threshold are extracted as moving blocks 706 (S4).

An image block 705 is a region into which an image is divided equally. The number of division is a predetermined number in accordance with the size of the image. The threshold may be a predetermined value or be changed dynamically.

Then, the moving blocks 706 are grouped by labeling the extracted moving blocks 706 (S5).

A rectangle which includes the grouped moving blocks inside is determined as a moving-object region 707. Here, the rectangle may be determined as a moving-object region only when the number of the grouped moving blocks is within a predetermined range. Then, the position of the moving-object region 707, for example, the center position or the gravity center position of the moving-object region is calculated (S6), and the information of the calculated position and the coordinates of the region is outputted to the moving-object tracking unit 5 as the moving-object data of the moving-object region 707 and stored therein.

Figure 3:
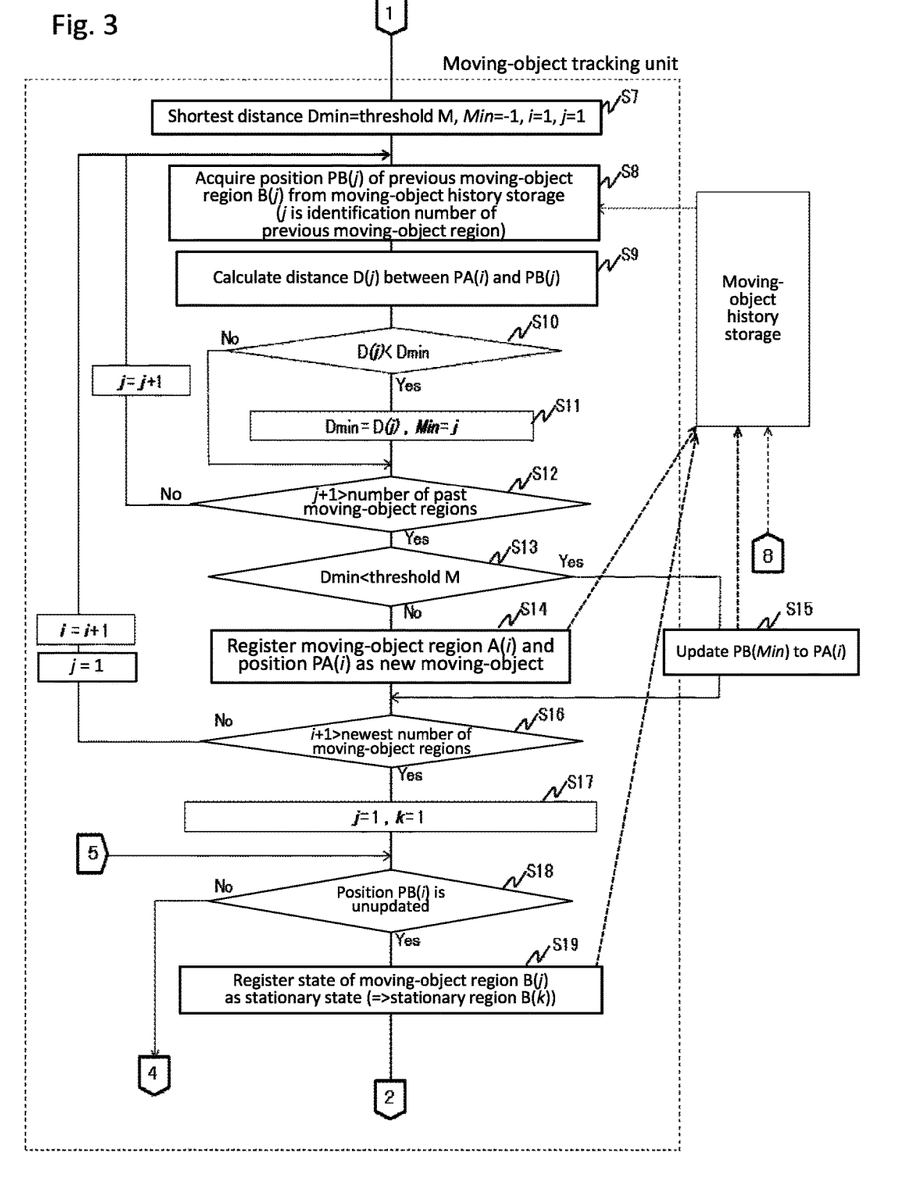
FIG. 3 is a flowchart which shows processing of a moving-object tracking unit 5 of the person detecting device 1 in the embodiment of the present invention.

Next, the processing of the moving-object tracking unit 5 will be explained using FIG. 3. The moving-object tracking unit 5 tracks the latest moving-object region inputted from the moving-object extraction unit 4 using the moving-object data of the past moving-object region stored in the moving-object history storage 6.

Firstly, the moving-object tracking unit 5 sets values for initialization as follows: "a threshold M" to the shortest distance Dmin between the position of the moving-object region of the previous frame and the position of the latest moving-object region, "−1" to the identification number Min of the past moving-object region with the shortest distance Dmin, "1" to the identification number i of the latest moving-object region inputted from the moving-object extraction unit 4, and "1" to the identification number j of the past moving-object region stored in the moving-object history storage 6 (S7).

When the moving-object data is inputted from the moving-object extraction unit 4, the moving-object tracking unit 5 acquires the history data of the moving-object data from the moving-object history storage 6 and conducts the following processing.

The position PB(j) of the moving-object region B(j) of the previous frame acquired from the moving-object history storage 6 is acquired as the previous position (S8).

Next, the distance D(j) between PB(j) and the position PA of the moving object of the moving-object region A is calculated, the position PA being the latest moving-object data inputted from the moving-object extraction unit 4 (S9).

Then, whether or not the calculated distance D(j) is smaller than the predetermined Dmin is determined (S10).

If the calculated distance D(j) is smaller than the predetermined Dmin, the moving-object tracking unit 5 sets the calculated distance D(j) to Dmin and sets to Min the identification number j of the moving-object region for which the distance is calculated (S11).

If the calculated distance D(j) is equal to or larger than the predetermined Dmin, the processing of S12 is conducted.

Whether or not j+1 is larger than the number of all the past moving-object regions acquired from the moving-object history storage 6 is determined (S12).

If j+1 is larger than the number of all the past moving-object regions, the processing of S13 is conducted.

If j+1 is equal to or smaller than the number of all the past moving-object regions, j+1 is set to j, the flow returns to the processing of S8, and the distance of the next past moving region from the latest moving-object region is calculated.

If j+1 is larger than the number of all the past moving-object regions, whether or not Dmin is smaller than the threshold M is determined (S13).

If Dmin is equal to or larger than the threshold M, the position PA(i) of the moving-object region A(i) is outputted to the moving-object history storage 6 as a new moving object (S14) and stored therein.

If the Dmin is smaller than the threshold M, PB(Min) is set to PA(i) and the position of the moving-object data in the moving-object history storage 6 is updated (S15).

Then, whether or not i+1 is larger than the number of the latest moving-object regions outputted from the moving-object extraction unit 4 is determined (S16), and if not, the flow returns to the processing of S8 with i=i+1 and j=1.

Next, the initialization is conducted with j=1 and k=1 (k is the identification number of the stationary region) (S17).

Then, whether the position PB(j) of the moving-object region of the previous frame has been unupdated is determined (S18).

If the position PB(j) of the moving-object region of the previous frame has been unupdated to the position of the moving-object region PA(i) inputted from the moving-object extraction unit 4, the moving-object region is stored as the stationary region B(k) where the moving object in the moving-object region B(j) is in a stationary state into the moving-object history storage 6 (S19).

If the position PB(j) of the moving-object region in the previous frame has been updated to the position of the moving-object region PA(i) inputted from the moving-object extraction unit 4, the processing of S21 is conducted.

Thus, the moving-object tracking unit 5 acquires information from the moving-object history storage on all the moving-object regions of the previous frame against the moving-object region extracted by the moving-object extraction unit 4, calculates the distances between the position of the moving-object region extracted by the moving-object extraction unit 4 and the positions of the moving-object regions of the previous frame, determines that the moving object in the moving-object region of the previous frame, whose distance is smaller than the threshold and is the shortest of all, and the moving object in the moving-object region extracted by the moving-object extraction unit 4 are the same moving object, and tracks it.

If the position of the moving-object region of the previous frame has not been updated to the position of the moving-object region extracted by the moving-object region extraction unit 12 of the moving-object extraction unit 4, the stationary region determination unit 13 of the moving-object tracking unit 5 determines the moving-object region to be a stationary region.

The threshold M was explained as predetermined. However, it may be predetermined or dynamically changed. If there are latest plural moving-object regions extracted by the moving-object extraction unit 4, the distances of each moving-object region from the positions of the moving-object regions of the previous frame are calculated to determine whether or not the moving objects are the same ones.

Although it is explained above that the stationary region determination unit 13 conducts the processing after the determination of whether or not the moving object of the moving-object region extracted by the moving-object extraction unit 4 and the moving object of the moving-object region of the previous frame are the same one, the stationary region determination unit 13 may conduct the processing for the moving-object tracking unit 5 (the processing to determine whether or not the same as the moving object in the moving-object region of the previous frame).

Figure 8:
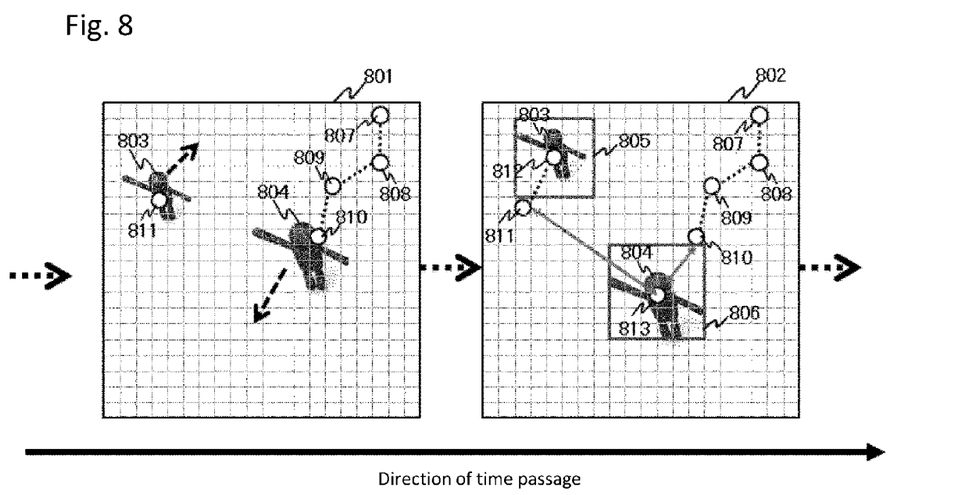
FIG. 8 is a diagram which explains processing of the moving-object tracking unit 5 in the embodiment of the present invention.

FIG. 8 is a diagram which shows a processing of the moving-object tracking unit 5 in the embodiment of the present invention.

The image 801 of FIG. 8 shows the moving-object data of the previous frame acquired by the moving-object tracking unit 5 from the moving-object history storage 6 in the image of the previous frame of the latest image stored in the primary storage. The image 802 shows the moving-object data inputted from the moving-object extraction unit 4 in the latest image stored in the primary storage.

The moving object 803 and the moving object 804 are photographed in the image 801. The moving object 803 and the moving object 804 are photographed in the image 802. The image 802 also shows the moving-object region 805 of the moving object 803 and the moving-object region 806 of the moving object 804 extracted by the moving-object extraction unit 4.

In the image 801, the positional histories 807, 808, 809 and 810 of the moving object 804 and the position 811 of the moving object 803, taken from the moving-object data stored in the moving-object history storage 6, are shown.

In the image 802, the position 812 of the moving object 803 and the position 813 of the moving object 804 inputted from the moving-object extraction unit 4, the positional histories 807, 808 and 809 of the moving object of the moving-object data acquired from the moving-object history storage 6, and the positions 810 and 811 of the moving object of the previous frame, are shown.

When the moving-object data is inputted from the moving-object extraction unit 4, the moving-object tracking unit 5 acquires, from the moving-object history storage 6, the position 810 of the moving object 804 and the position 811 of the moving object 803, as the previous positions, which are the moving-object data of the previous frame.

Then, the distance between the position 813 of the moving object 804 of the moving-object region 806 which is the latest moving-object data inputted from the moving-object extraction unit 4 and the position 810 of the moving-object region acquired from moving-object history storage 6, and the distance between the position 813 of the moving object 804 of the moving-object region 806 which is the latest moving-object data inputted from the moving-object extraction unit 4 and the position 811 of the moving-object region acquired from the moving-object history storage 6 are calculated.

Here, it is supposed that the distance between the position 813 of the moving-object region 806 inputted from the moving-object extraction unit 4 and the position 811 of the moving-object region acquired from the moving-object history storage 6 is smaller than the threshold. And it is also supposed that the distance between the position 813 of the moving-object region 806 inputted from the moving-object extraction unit 4 and the position 810 of the moving-object region acquired from the moving-object history storage 6 is smaller than the threshold. Then, because the distance between the position 813 of the moving-object region 806 inputted from the moving-object extraction unit 4 and the position 810 of the moving-object region acquired from the moving-object history storage 6 is shorter than the distance between position 813 of the moving-object region 806 inputted from the moving-object extraction unit 4 and the position 811 of the moving-object region acquired from the moving-object history storage 6, the moving-object data of the position 810 of the moving-object region and the moving object of the moving-object region 806 inputted from the moving-object extraction unit 4 are determined to be the same moving object. The position of the moving-object region 806 inputted from the moving-object extraction unit 4 is stored as the position of the same moving object stored in the moving-object history storage 6.

Figure 9:
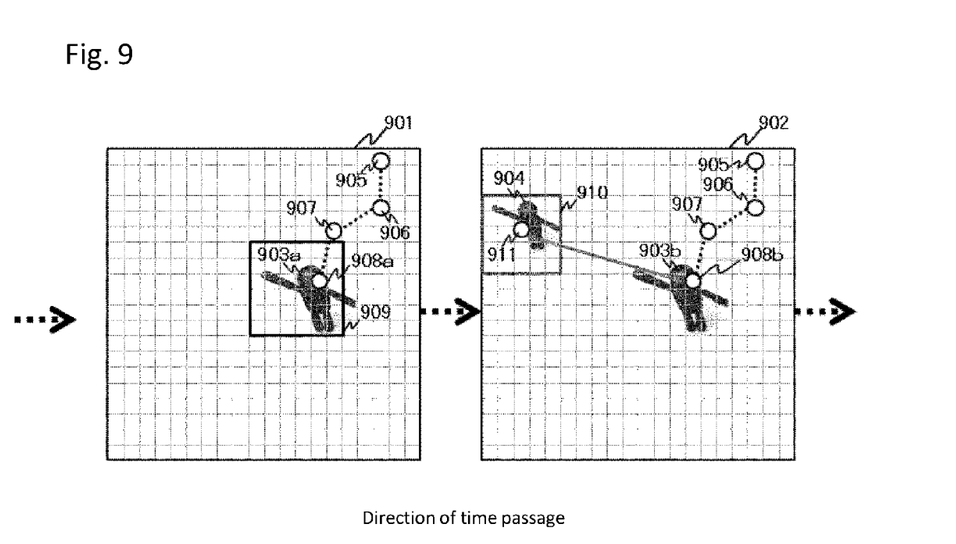
FIG. 9 is a diagram which explains processing of a stationary region determination unit 13 of the moving-object tracking unit 5 in the embodiment of the present invention.

Next, the processing for the stationary region determination unit 13 of the moving-object tracking unit 5 to determine that the moving object of the tracked moving-object region is in a stationary state to generate a stationary region will be explained.

FIG. 9 is a diagram of the image which explains the operation of the stationary region determination unit 13 of the moving-object tracking unit 5 in the embodiment of the present invention.

The image 901 in FIG. 9 shows the tracking positions of the moving-object data acquired by the moving-object tracking unit 5 from the moving-object history storage 6 in the image of the previous frame of the latest image stored in the primary storage. The image 902 shows the moving-object region inputted from the moving-object extraction unit 4 in the latest image stored in the primary storage.

The image 901 shows the moving object 903a photographed in the image of the previous frame of the latest image, and the image 902 shows the moving object 903b and the moving object 904 photographed in the latest image.

The image 901 shows the positions (905, 906, 907, 908a) which track the moving object 903a acquired from the moving-object history storage 6 and the moving-object region 909 of the moving object 903a. The image 902 shows the positions (905, 906, 907, 908b) which track the moving object 903b and the position 911 of the moving-object region 910 inputted from the moving-object extraction unit 4.

When the moving-object data is inputted from the moving-object extraction unit 4, the moving-object tracking unit 5 determines the moving object on the basis of the distance between the position of the moving-object region extracted by the moving-object extraction unit 4 and the position of the moving-object region of the previous frame acquired from the moving-object history storage 6. If the moving object is determined as the same moving object as appears in the previous frame, the position of the moving object is updated with the position of the moving-object region extracted by the moving-object extraction unit 4.

If the position 908b of the moving object 903b acquired from the moving-object history storage 6 has not been updated to the position of the moving-object region extracted by the moving-object extraction unit 4, the stationary region determination unit 13 of the moving-object tracking unit 5 determines the moving object 903b to be in a stationary state. If the moving object 903b is determined to be in a stationary state, the moving-object region 909 of the moving object 903a extracted by the moving-object region extraction unit 12 of the moving-object extraction unit 4 in the image of the previous frame is set to be a stationary region, and the state information of the moving object 903b of the moving-object history storage 6 is changed to a stationary state.

When the moving-object tracking unit 5 acquires the position 911 of the moving-object region 910 from the moving-object extraction unit 4, the distance between the position 911 and the position of the moving-object region of the image 901 of the previous frame is calculated. In FIG. 9, the distance between the position 911 and the position 908a (=the position 908b) is calculated. If the distance is equal to or larger than the threshold M, the moving-object tracking unit 5 outputs the position 911 of the moving-object region 910 as the position of the moving-object data of the new moving object 904 to the moving-object history storage 6 to store therein.

Figure 10:
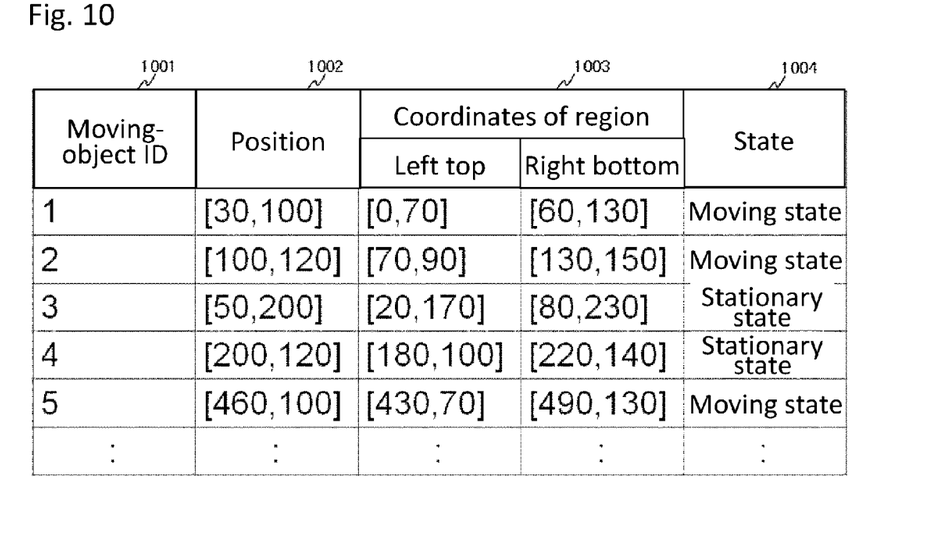
FIG. 10 is an example of moving-object data stored in a moving-object history storage 6 in the embodiment of the present invention.

FIG. 10 is an example of the moving-object data stored in the moving-object history storage 6 in the embodiment of the present invention.

As shown in FIG. 10, in the moving-object history storage 6, data such as a moving-object ID to identify a moving object, a position of a moving-object region (center position or gravity center position), coordinates of a moving-object region, and state information of a moving object (moving state or stationary state) are stored.

In the moving-object history storage 6, the moving-object data is inputted from the moving-object tracking unit 5 and the inputted moving-object data is stored. Then, when the moving-object region extracted from the moving-object extraction unit 4 is inputted, the moving-object tracking unit 5 determines whether the moving object of the extracted moving-object region is in a moving state, in a stationary state, or a new moving object, in accordance with the distance between the position of the extracted moving-object region and the position of the moving-object region stored in the moving-object history storage 6. The determination result is outputted to the moving-object history storage 6 and stored therein.

Figure 4:
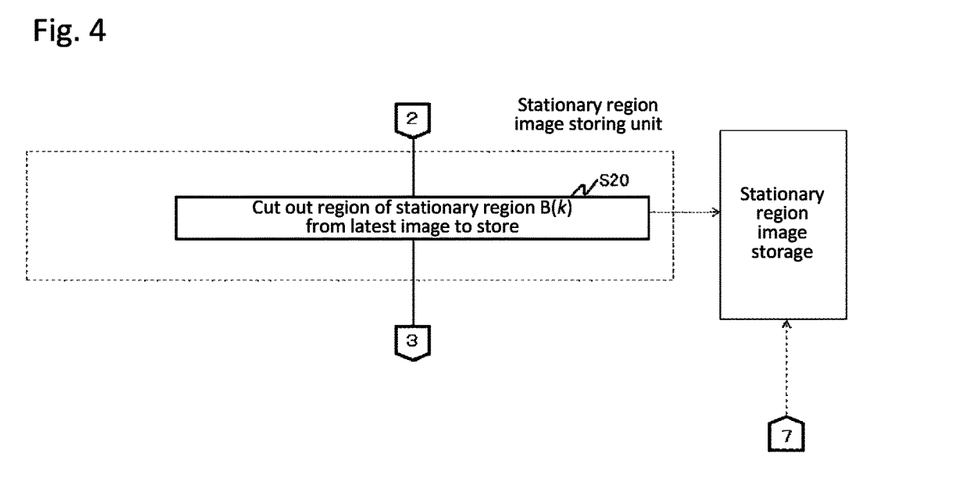
FIG. 4 is a flowchart which shows processing of a stationary region image storing unit 7 of the person detecting device 1 in the embodiment of the present invention.

Next, using FIG. 4, the processing of the stationary region image storing unit 7 will be explained.

When the data of a stationary region is inputted in the moving-object history storage 6 (when data of stationary state is inputted in moving-object data), the stationary region image storing means 7 cuts out the image of the stationary region B(k) from the latest image stored in the primary storage and outputs it to the stationary region image storage 8 to store the latest image of the stationary region B(k) (S20).

Figure 11:
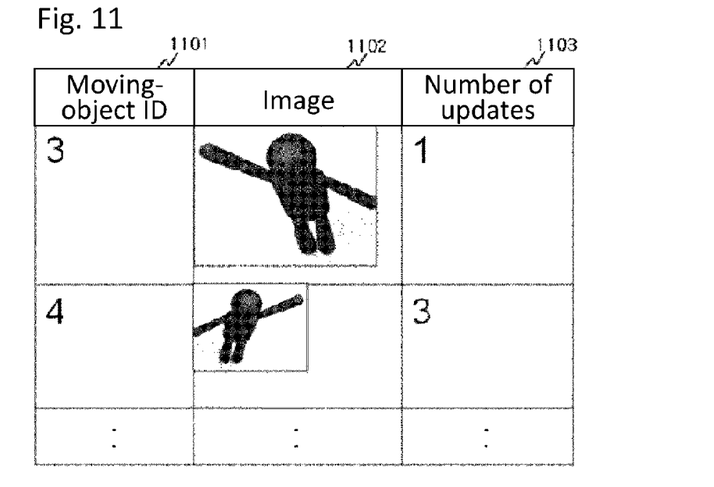
FIG. 11 is an example of image data of a stationary region stored in a stationary region image storage 8 in the embodiment of the present invention.

FIG. 11 is an example of image data of the stationary region stored in the stationary region image storage 8 in the embodiment of the present invention.

In the stationary region image storage 8, the moving-object ID1101, the image 1102 and the number of updates 1103, for example, are stored.

In the moving-object ID1101, the same moving-object ID as stored in the moving-object history storage 6 is stored. The image 1102 is a cut-out image of only the stationary region from the latest image. In the stationary region image storage 8, because the image of the same moving-object ID can be updated any number of times, the number of updates 1103 shows the number of times the image of the same moving-object ID has been updated.

Figure 5:
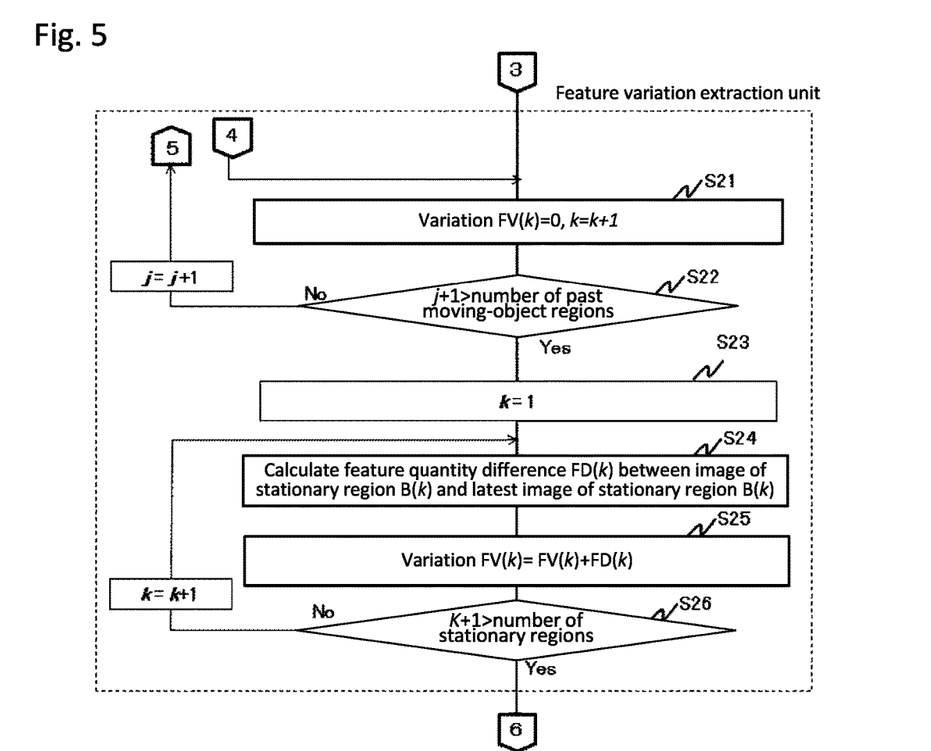
FIG. 5 is a flowchart which shows processing of a feature variation extraction unit 9 of the person detecting device 1 in the embodiment of the present invention.

Next, using FIG. 5, the processing of the feature variation extraction unit 9 will be explained.

When the latest image of the stationary image is stored in the stationary region image storage 8, the feature variation extraction unit 9 conducts the following processing. Firstly, the feature variation of the image is initialized (FV(k)=0) and the identification number of the stationary region is incremented to the next identification number (k=k+1) (S21).

Then, it is determined whether or not the number of the acquired images of the stationary regions has reached the number of the past moving-object regions stored in the moving-object history storage 6 (S22).

If the number of the acquired images has not reached the number of the past moving-object regions, the flow returns to the processing of S18.

If the number of the acquired images has reached the number of the past moving-object regions, the following processing is conducted.

Firstly, the identification number of the stationary region is initialized (k=1) (S23).

When information of a stationary region is stored in the moving-object history storage 6 (when information of stationary state is stored in moving-object data), the feature variation extraction unit 9 calculates the image feature difference FD(k) between the image of the stationary region B(k) stored in the stationary region image storage 8 and the image of the stationary region of the latest image stored in the primary storage (S24) to extract the feature variation of the images.

Then, the grand total of the feature variation is calculated by adding the feature variation to FV(k) as shown in feature variation FV(k)=FV(k)+FD(k) (S25).

Along with determining whether or not the identification number k+1 of the stationary region is larger than the number of the stationary regions (S26), the feature variations continue to be extracted until the feature variations are extracted for all the stationary regions.

If the identification number k+1 is equal to or smaller than the number of the stationary regions, the identifier is incremented to the next stationary region and the flow returns to S24.

If k+1 is larger than the number of the stationary regions, the calculated feature variation is outputted to the stationary person determination unit 10, and the processing of the stationary person determination means 10 after S27 is conducted.

Figure 12:
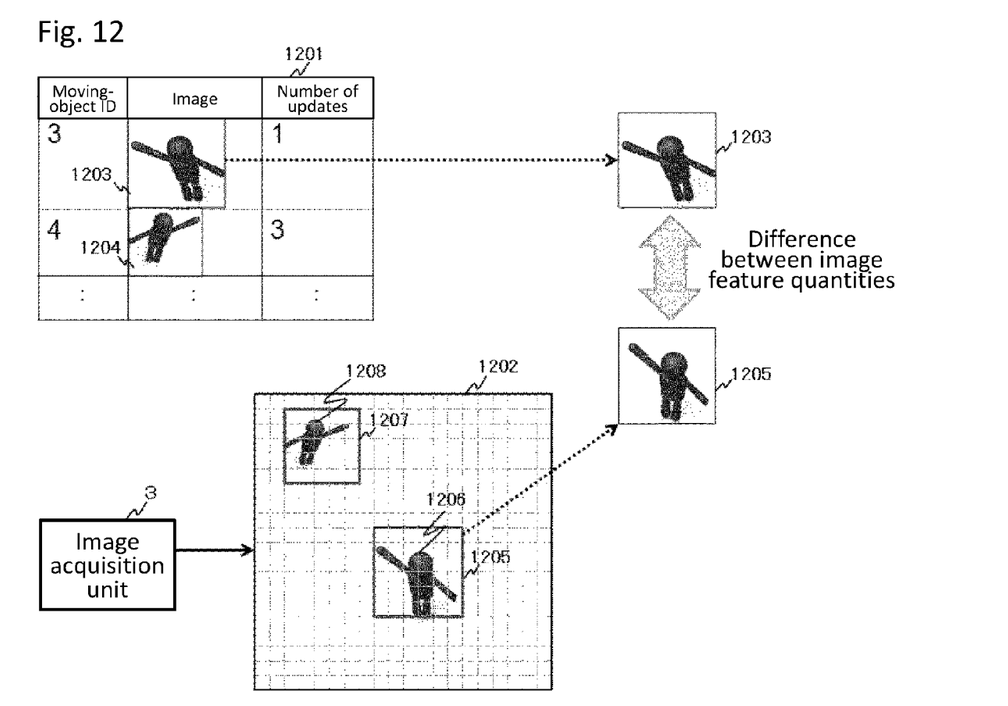
FIG. 12 is a diagram which explains an operation of the feature variation extraction unit 9 in the embodiment of the present invention.

Here, the operation of the feature variation extraction unit 9 will be explained using image examples.

FIG. 12 is a diagram of images which shows the operation of the feature variation extraction unit 9 in the embodiment of the present invention.

In FIG. 12, the stationary region image data 1201 stored in the stationary region image storage 8 and the latest image 1202 acquired by the image acquisition unit 3 and stored in the primary storage are shown.

In the stationary region image data 1201, it is shown that the image 1203 of the stationary region corresponding to the moving-object ID3 and the image 1204 of the stationary region corresponding to the moving-object ID4 are stored.

The feature variation extraction unit 9 acquires the information (position and region coordinates) of the stationary region corresponding to the moving-object ID3 from the moving-object history storage 6. The stationary region 1205 of the latest image 1202 corresponding to the acquired stationary region is shown in the latest image 1202. In this stationary region 1205, there is the image of the moving object 1206. The infoi illation of the stationary region corresponding to the moving-object ID4 is acquired from the moving-object history storage 6. The stationary region 1207 of the latest image 1202 corresponding to the acquired stationary region is shown in the latest image 1202. In this stationary region 1207, there is the image of the moving object 1208.

Then, the feature variation extraction unit 9 calculates the difference between the image feature quantity of the stationary region 1203 stored in the stationary region image storage 8 and the image feature quantity of the stationary region 1205 cut out from the latest image acquired from the primary storage.

For calculation of the difference in the feature quantities, a difference between images by Template Matching, a difference in HOG feature quantities, or a difference in luminance histograms is used. The difference described above may be defined as the variation in the image feature quantity. Also, the grand total of the feature quantity differences calculated when the above processing is repeated for a predetermined period of time or a predetermined number of times may be defined as the variation in the image feature quantity. When repeating the above processing, the timing to update the image of the stationary region stored in the stationary region image storage 8 to the stationary region of the latest image may be either at every repetition basis or when a certain condition is met. For example, when the feature quantity difference becomes equal to or larger than a predetermined value, the image of the stationary region is updated to the latest image.

The above is the explanation of operation of the feature variation extraction unit 9 using example images.

Figure 6:
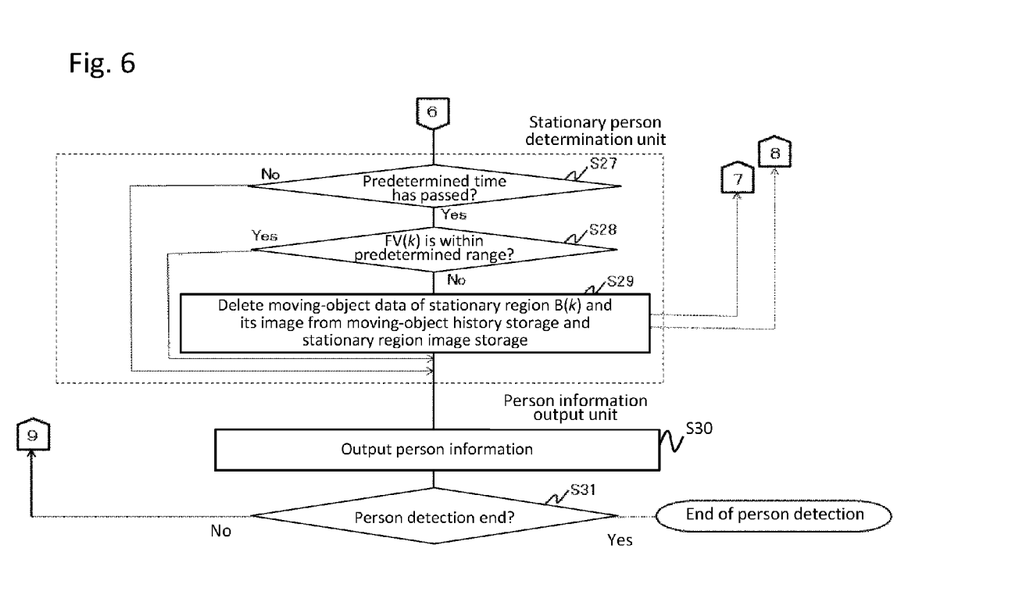
FIG. 6 is a flowchart which shows processing of a stationary person determination unit 10 of the person detecting device 1 in the embodiment of the present invention.

Next, the processing of the stationary person determination unit 10 and the person information output unit 11 will be explained using FIG. 6.

When the feature variation of the image is inputted from the feature variation extraction unit 9, the stationary person determination unit 10 determines presence or absence of a person in the stationary region and reflects the result in the moving-object history storage 6.

Firstly, the stationary person determination unit 10 determines whether or not the predetermined time has passed (S27).

If the predetermined time has not passed, the processing of S30 is conducted.

If the predetermined time has passed, whether or not the feature variation FV(k) extracted by the feature variation extraction unit 9 is within the predetermined range is determined (S28).

If FV(k) is not within the predetermined range, the moving-object data of the stationary region B(k) is deleted from the moving-object history storage 6, the image of the stationary region B(k) is deleted from the stationary region image storage 8 (S29), and then the flow goes to the processing of S30 of the person information output unit 11.

If FV(k) is within the predetermined range, the stationary region B(k) is determined to include a person inside and the processing of S30 is conducted.

Thus, when it determines that the stationary region inputted from the feature variation extraction unit 9 includes no person inside, the stationary person determination unit 10 reflects the data of the stationary person, determined to be present, in the moving-object history storage 6 by deleting the data of the stationary region from the moving-object history storage 6.

Figure 13:
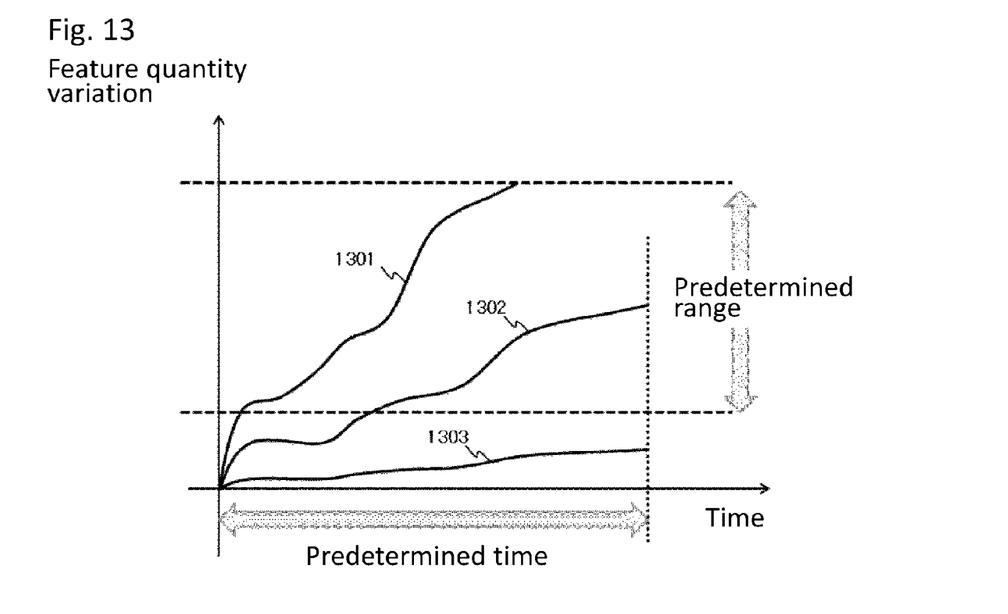
FIG. 13 is a diagram which shows feature variations for the stationary person determination unit 10 to determine a stationary person in the embodiment of the present invention.

Here, the processing for the stationary person determination unit 10 to determine a stationary person by the feature variation will be explained showing a diagram.

FIG. 13 is a diagram which shows the feature variations by which the stationary person determination unit 10 determines a stationary person in the embodiment of the present invention.

In FIG. 13, the feature variations 1301, 1302 and 1303 are shown.

For example, the feature variation 1302 is within the predetermined range after the predetermined period of time has passed. In this case, the stationary person determination unit 10 determines that there is a person in the stationary region of the feature variation 1302.

The feature variation 1301 goes out of the predetermined range before the predetermined period of time has passed. In this case, the stationary person determination unit 10 determines that there is no person in the stationary region of the feature variation 1301.

The feature variation 1303 stays out of the predetermined range when the predetermined period of time has passed. Also in this case, the stationary person determination unit 10 determines that there is no person in the stationary region of the feature variation 1303.

When repeating the above explained processing, the timing to update the image of the same stationary region in the stationary region image storage 8 to the same stationary region of the latest image may be at every repetition basis or when a certain condition is met. For example, when the feature quantity difference becomes equal to or larger than the predetermined value, the image of the same stationary region may be updated to the latest image.

In FIG. 13, while the predetermined range is shown as a range where the feature variation is equal to or larger than a certain value, the predetermined range may be defined as a range starting from zero so as to include a state of no change in the variation.

Here, the determination of a person by using the feature variation will be explained.

When a person moves, an object other than persons such as a chair and a table with casters often moves.

Then, in the moving-object extraction unit 4 and the moving-object tracking unit 5, the object which moved, other than persons, is erroneously recognized as a moving object. In everyday life, however, a person does perform fine movements even in a stationary state, which may not be recognized as a moving state by the moving-object tracking unit 5, and very few people can stay so long without any move.

On the other hand, an object such as a chair and a table does not move for a long time after a move. The difference is reflected in the feature variation of the image extracted by the feature variation extraction unit 9. An object such as a chair and a table takes extremely small value for the variation (for example, the feature variation 1303 in FIG. 13). Therefore, when the variation is smaller than a predetermined value, the stationary region is determined to be an object other than persons.

When a person moves or stops around a TV set or a PC monitor, the TV set or the PC monitor, not the person, may be generated as a stationary region. In such a stationary region, the feature variation of the image takes a large value by the display of the TV set or the PC monitor (for example, the feature variation 1301 in FIG. 13). Therefore, when the variation is larger than a predetermined range, erroneous determination as a person can be prevented from occurring by determining the stationary region to be an object such as a TV set or a PC monitor.

It is explained above that, when determined that there is no person by the stationary person determination unit 10, the stationary region is deleted from the moving-object history storage 6 and the stationary region image storage 8. For another way, however, when a stationary region has continued to be determined to include no person in the course of the repeated determination of presence or absence of a person for a predetermined period of time or a number of times in the feature variation extraction unit 9 and the stationary person determination unit 10, the determined stationary region may be deleted from the moving-object history storage 6 and the stationary region image storage 8.

When a stationary region has continued to be determined to include no person by the stationary person determination unit 10, the image of the stationary region stored in the stationary region image storage 8 may be updated again to the image of the stationary region cut out from the latest image. By doing so, even if the image feature quantity falls outside the threshold range despite the presence of a stationary person in the stationary region, due to an overlap, with the stationary image, of the image of a moving-object region of another person who passes by the stationary person determined by the stationary image, the stationary person can be detected from the image of the stationary region cut out from the latest image.

When a stationary region has continued to be determined to include no person inside by the stationary person determination unit 10, plural images of stationary regions cut out again from the latest image may be stored in the stationary region image storage 8.

In the embodiment, it is explained that the stationary region determined to include no person inside is deleted from the moving-object history storage 6. However, for example, when the distance between the position of the stationary region determined to be a stationary region and the position of the moving-object region of the next image extracted by the moving-object extraction unit 4 is smaller than a predetermined threshold, the stationary region of the moving-object history storage 6 may be changed to a moving-object region, determining that the moving object in the stationary region has moved to the moving-object region.

Next, the operation of the information output unit 11 will be explained.

The person information output unit 11 acquires the moving-object data of the moving-object regions and the stationary regions stored in the moving-object history storage 6 at a predetermined time interval or upon a request from an external device, and outputs, for example, the number and the positions of the moving-object data as the person information to the external device (S30).

Then, whether or not the person detection is finished is determined (S31).

If the person detection is finished, the person detection processing is ended.

If the person detection is not finished, the flow returns to the processing of S1.

The destination of the output from the person information output unit 11 may be a control unit of an external device or an external system.

Because the stationary person determination unit 10 deletes the stationary regions determined to include no person inside from the moving-object history storage 6, the moving-object regions and the stationary regions stored in the moving-object history storage 6 are regions in which a person is present. A person position which constitutes person information is, for example, either the center position or the gravity center position of the moving-object region or the stationary region.

Optimal energy saving control in accordance with presence or absence of persons, the positions and the number of persons will be made possible by providing the person information generated as explained above to control units of lighting or air conditioning, or apparatus management systems.

In the control of lighting apparatus, because a person sensor using infrared rays cannot sense a stationary person, the lighting apparatus may be turned off even when a person is present there. Also, even if persons are moving, the positions, within the coverage area of a sensor, of the persons are unknowable. Therefore, in a case of facilities such as offices and factories where many lighting apparatuses are set, it is impossible to specify the lighting apparatuses to be adjusted in order to get an optimum brightness.

However, a stationary region is determined on the basis of the distances between the moving-object region extracted by using an image and the moving-object regions of the previous frame, and whether or not a person is stationary in the stationary region is determined by using the variation of the feature quantity of the image. Therefore, the presence or absence, the positions and the number of persons, including those of stationary persons, can be detected. As the result, the lighting apparatuses can be turned on or off, taking stationary persons in consideration. In a case of facilities such as offices and factories where many lighting apparatuses are set, the lighting apparatuses can be appropriately adjusted in accordance with presence or absence, the positions and the number of persons.

In a case of person sensors which use infrared rays, it is necessary to narrow down the sensor area and to install many sensors. Consequently, the cost will increase. If images are used, the cost can be suppressed due to the wider coverage area to detect persons.

Besides energy saving, a variety of control systems for optimal operation of elevators to shorten the waiting time, for congestion degrees, for crime prevention and safety management by detecting intrusion to restricted areas, and the like are also target applications.

INDUSTRIAL APPLICABILITY

As explained above, the person detecting device and person detecting method which relates to the present invention determine a stationary region on the basis of the distance between the position of a first moving-object region extracted from an image and the position of a second moving-object region extracted from an image previous to the image of the first moving-object region. Because presence or absence of a person is determined by using the variation of feature quantities of the images of the stationary regions, lighting or air-conditioning control devices, for example, can be controlled by using person information including a stationary person without collecting or registering a large volume of image feature quantities in advance. A variety of apparatus management systems for elevator operation to shorten the waiting time, for congestion degrees, crime prevention and safety management by detecting intrusion to restricted areas are also target applications.

DESCRIPTIONS OF SYMBOLS

1: person detecting device, 2: camera, 3: image acquisition unit, 4: moving-object extraction unit, 5: moving-object tracking unit, 6: moving-object history storage, 7: stationary region storing unit, 8: stationary region image storage, 9: feature variation extraction unit, 10: stationary person determination unit, 11: person information output unit, 12: moving-object region extraction unit, 13: stationary region determination unit

The invention claimed is:

1. A person detecting device comprising:
a processor; and
a memory having stored therein instructions that cause the processor to
acquire, from a camera, a photographed image;
determine, on the basis of a distance between a position of a first moving-object region extracted from a currently acquired image and a position of a second moving-object region extracted from an image acquired prior to the currently acquired image, a stationary region where a moving-object of the second moving-object region is in a stationary state;
extract variations between feature quantities of images of stationary regions having been stored for the stationary regions and a feature quantity of the currently acquired image; and
determine presence or absence of a person in the stationary region using the extracted variations, wherein the stationary region is determined to include a person when the variation is within a predetermined range.

2. The person detecting device according to claim 1, wherein the processor determines the second moving-object region to be a stationary region both when the distance between the position of the first moving-object region and the position of the second moving-object region is larger than a predetermined threshold and when the distances between the positions of all the other moving-object regions extracted from the image of the first moving-object region and the position of the second moving-object region are larger than a predetermined threshold.

3. The person detecting device according to claim 2, wherein
the memory stores information on the moving-object regions as moving-object information; and
the processor outputs person information from the moving-object information stored in the memory to the outside, wherein the processor stores information on the stationary region determined to include a person as moving-object information in the memory, and the processor outputs positions and the number of persons from the moving-object information stored in the moving-object history storage as the person information.

4. The person detecting device according to claim 3, wherein the processor stores information on the stationary region as moving-object information in the memory when determining the stationary region, previously determined to include no person inside, to include a person by using information on the stationary region newly extracted from an image later than the image from which the first moving-object region was extracted.

5. The person detecting device according to claim 1, wherein the memory has stores information on the moving-object regions as moving-object information; and the processor outputs person information from the moving-object information stored in the moving-object history storage to the outside, wherein the processor stores information on the stationary region determined to include a person as moving-object information in the memory, and the processor outputs positions and the number of persons from the moving-object information stored in the moving-object history storage as the person information.

6. The person detecting device according to claim 5, wherein the processor stores information on the stationary region as moving-object information in the memory when determining the stationary region, previously determined to include no person inside, to include a person by using information on the stationary region newly extracted from an usage later than the image from which the first moving-object region was extracted.

7. A person detecting method for a person detecting device using photographed images to detect a stationary person, the method comprising:

acquiring, from a camera, a photographed image;

determining, on the basis of a distance between a position of a first moving-object region extracted from a currently acquired image and a position of a second moving-object region extracted from an image acquired prior to the currently acquired image, a stationary region where a moving-object of the second moving-object region is in a stationary state;

extracting variations between feature quantities of the images of stationary regions having been stored for the stationary regions and a feature quantity of the currently acquired image; and determining presence or absence of a person in the stationary region using the extracted variations, wherein the stationary region is determined to include a person when the variation is within a predetermined range.

* * * * *